(No Model.)
C. H. PIKE.
PLANE.
No. 307,223. Patented Oct. 28, 1884.
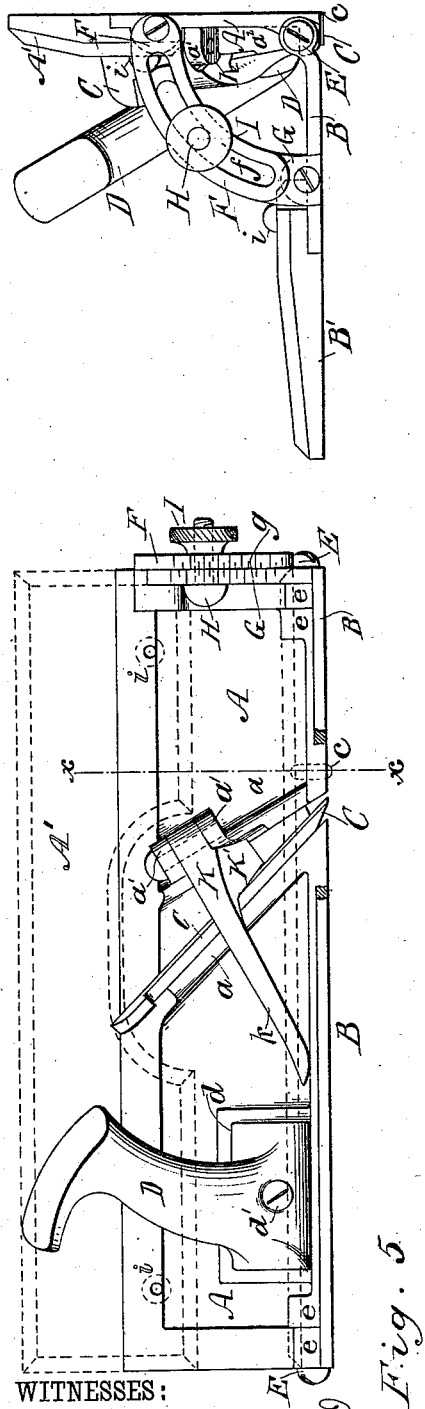
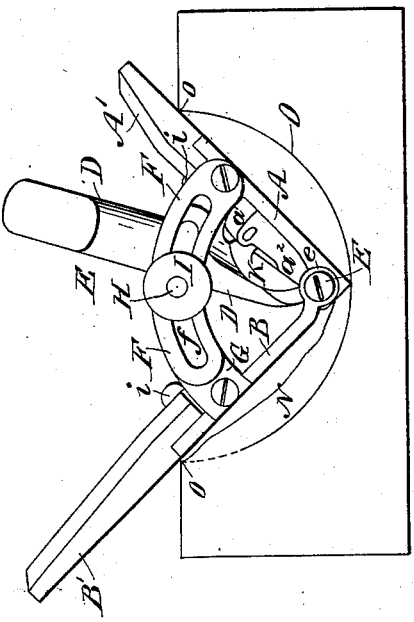
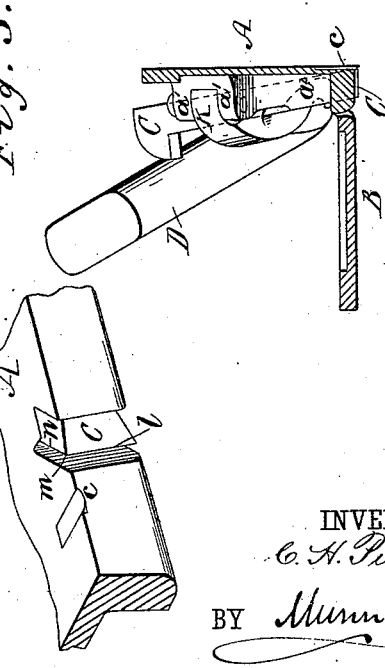
WITNESSES:
INVENTOR:
C. H. Pike
BY Munn & Co
ATTORNEYS.

UNITED STATES PATENT OFFICE.

CHARLES H. PIKE, OF WEST TROY, NEW YORK.

PLANE.

SPECIFICATION forming part of Letters Patent No. 307,223, dated October 28, 1884.

Application filed June 28, 1884. (No model.)

*To all whom it may concern:*

Be it known that I, CHARLES H. PIKE, of West Troy, in the county of Albany and State of New York, have invented a new and Improved Wood-Plane, of which the following is a full, clear, and exact description.

The object of my invention is to provide a simple, efficient, and inexpensive tool to be used by wood-workers for economically dressing out the hollow faces of pieces of lumber or timber used in making round or curved work, such as tubes, stair-cylinders, or round or curved patterns to make castings from, and a large variety of crooked or curved work.

The invention consists of a wood-plane having a stock made in two parts, hinged to each other so as to be adjusted and fastened at any required angle with each other, for causing the cutter held at the angle of the two-part stock to dress the roughed-out work to the required transverse curve as the plane is rocked axially while being passed backward and forward over the work, with the faces of the opposite parts of the stock resting on trued edges of the work.

The invention includes, also, particular construction and combination of parts of the plane, all as hereinafter fully described and claimed.

Reference is to be had to the accompanying drawings, forming a part of this specification, in which similar letters of reference indicate corresponding parts in all the figures.

Figure 1 is an outside longitudinal sectional elevation of my improved plane. Fig. 2 is a front end view thereof. Fig. 3 is a cross-sectional elevation on the line $x\ x$, Fig. 1. Fig. 4 is a front view illustrating the manner of using the plane, and Fig. 5 is a detail perspective view.

I make the plane-stock in two parts or sections—the part A, to which the cutters C c and handle D are held, and a part, B, which is jointed to the part A lengthwise on pivots E, which pass through lugs $e\ e$ formed at the ends of the parts A B. At the front end of the plane the parts A B of the stock have fixed curved or segmental arms F G, respectively, which arms are centrally slotted, as at $f$, and the arms are so shaped and located that their slots coincide always, irrespective of the angle at which the parts A B are set relatively to each other. A headed screw-bolt, H, is passed through the slots of both arms, F G, and has a suitable thumb-nut, I, by which the arms may be bound tightly to each other to hold the parts A B of the stock at any relative angle at which they may be set.

I prefer to make that part of the screw-bolt H which enters the slots $f$ of the curved arms square in cross-section, and fit it loosely in the slots, which allows the nut I to be turned on and off or tightened or loosened without holding the head of the bolt H.

I propose to graduate the top edges of the curved arms F G, as at $g$, Fig. 1, so that the angle at which the part B of the stock is set with the part A thereof will clearly be indicated, and the adjustment of said parts A B with each other by swinging one or both of them on the pivots E may more readily and correctly be made.

I provide the stock parts A B with the extension pieces or fences A' B', respectively, which are fastened on by screws, as at $i$, so that wider or narrower fence-pieces may quickly be substituted one for the other, as the nature of the work shall require.

I hold the main cutter C against the shoulder-plate $a$ of the part A by means of a cam-lever, K, which is pivoted on a stout pin between lugs $a'\ a'$ on the part A, and so that when the lever-handle $k$ is swung over flat against the part A the acting head K' of the lever K will bind the cutter C firmly to the shoulder $a$. A rib or shoulder, $a^2$, on the part A, in front of the cutter C, forms the front wall of the throat of the plane, and the outer face of the lever-head K' inclines to the stock suitably to permit free passage of the shavings. The cutter $c$, in advance of the main cutter, is an ordinary dado or slitting cutter set in a face-slot of the stock. I fasten the handle within a socket formed at $d$ in the stock and by means of a screw, $d'$, as shown, which makes a strong connection. The cutter C is beveled back and sharpened, so that it will cut at the faces of both parts A B of the stock; but the main cutting-edge is the one, $l$, which projects from the lower edge of the part A, and is beveled back slightly across the width of the cutter from the sharp corner $m$, between the cutting-edges $l\ n$. (See Fig. 5.)

In operating the plane either lengthwise or crosswise of the grain of the wood, the parts A B of the stock will be set at the required relative angle, and there fastened by the screw bolt and nut H I. The work having been roughed out, as at N, Fig. 4, and the two top corners of the work at the edges o o of the groove or channel to be finished having been trued or straightened to serve as guides to the faces of the stock parts A B and their extension-fences A' B', the plane is laid on the edges o o and gradually turned on its lengthwise axis as it is moved backward and forward to permit the cutters c C to remove successive shavings from the roughed-out hollow face at N and produce a truly-curved and quite smoothly-finished face, as at O. With the faces of the parts A B of the stock set about at right angles with each other, half-circles, as at O, ranging from one and one-quarter inches to six or eight inches across, may be finished. It is evident that should the parts A B be set at a greater or obtuse angle with each other the finished work will be in segments of larger circles, depending on the extent of the angular adjustment of the two parts of the stock. The greater the angularity of the faces the larger the sweep of the circle described by the cutter will be, as will readily be understood.

The dado-cutter c is especially useful in cross-grain cutting, as when a number of pieces are fastened together, to finish their inner faces to serve as parts of patterns for wheels and the like.

My improved plane may be used to cut tapering segmental grooves, and in doing this the groove will be laid out in pencil at the opposite ends of the work and along the face, and then the groove will be roughed out, and by keeping the right-hand wing down and the other wing free and shoving the plane in line with the axis of the groove from the larger toward the smaller end of the groove one-half of it will be dressed out. The work then is reversed, and the left-hand wing is kept down and the right-hand one free, and the plane is shoved as before, which will finish the groove to the taper required, as I have often done; but this use of the plane requires skill in handling it.

By placing the end of the plane onto the circle or segment laid out at the end of the work, the plane-wings may be set to any segment.

I propose to make all parts of the plane of metal, except the fence-pieces A' B' and the handle D, which will be made of wood. It requires but a slight filing and sand-paper dressing to bring the trued faces O produced by the cutters to a smooth finish.

Having thus described my invention, I claim as new and desire to secure by Letters Patent—

1. The bench-plane comprising the wings or sections hinged or pivoted directly together, one of said wings or sections having a lateral base portion to form the bit-stock, and the two-edged cutter or bit with one edge disposed to project through one side or face of said bit-stock wing or section and the other edge disposed to project through the bottom side or face of said lateral portion, substantially as and for the purpose set forth.

2. In a bench-plane, the hinged or pivoted sections or wings, one of said wings or sections carrying a two-edged cutter or bit with one edge at right angles to the other edge, and a single-edged cutter disposed in line with one of the cutting-edges of said two-edged cutter, substantially as and for the purpose set forth.

3. In a bench-plane, the hinged or pivoted sections or wings, one carrying a two-edged cutter with one edge at right angles to the other edge, and a single-edged cutter disposed in line with one edge of said two-edged cutter, said wings or sections having adjustable extensions, substantially as and for the purpose set forth.

4. In a bench-plane, the hinged or pivoted sections or wings, one having a two-edged cutter with one edge at right angles to the other edge, and the single-edged cutter disposed in alignment with one edge of said two-edged cutter, said wings or sections being connected by curved slotted arms and adjusting-screw, substantially as and for the purpose specified.

5. In a bench-plane, the bit-stock wing or section with the bit throat or passage formed of an inclined bit-supporting plate and a second inclined plate disposed a short distance in advance of said bit-supporting plate, in combination with the cam-lever pivoted upon a pin between lugs of said wing or section, substantially as and for the purpose set forth.

6. In a bench-plane, the bit-stock section or wing with the bit throat or passage formed of an inclined bit-supporting plate and a second inclined plate disposed a short distance in advance of the bit-supporting plate, in combination with the cam-lever with its head bearing against the bit stock or shank and its flat side bearing against said section or wing, substantially as and for the purpose described.

7. In a bench-plane, the section or wing having a square socket, in combination with the handle having a square enlargement and disposed obliquely or at an acute angle to said enlargement, substantially as and for the purpose set forth.

CHARLES H. PIKE.

Witnesses:
SAMUEL ANDREWS,
THOS. J. LACY.